United States Patent [19]
Simmons et al.

[11] Patent Number: 5,869,555
[45] Date of Patent: Feb. 9, 1999

[54] POLYMERIC COMPOSITION IN PELLET FORM

[75] Inventors: Eugene R. Simmons, Vadnais Heights; Kevin J. Sweeney, Mahtomedi; Jeffrey S. Lindquist, Cottage Grove, all of Minn.; Christopher E. Olson, Blue Ash, Ohio; Freddie C. Carter, West Paducah, Ky.; James R. Farmer, Johnston City, Ill.

[73] Assignee: H. B. Fuller Licensing & Financing Inc., St. Paul, Minn.

[21] Appl. No.: 751,828

[22] Filed: Nov. 18, 1996

Related U.S. Application Data

[63] Continuation-in-part of Ser. No. 559,006, Nov. 16, 1995, abandoned.

[51] Int. Cl.⁶ .............................. C08K 5/20; C08K 5/01; C08L 93/04; C08L 53/02
[52] U.S. Cl. ................. 524/229; 524/232; 524/271; 524/274; 524/487; 524/488; 524/489; 524/505; 524/504; 525/74; 525/64; 525/95; 525/98; 525/99; 525/210; 525/211; 525/216; 525/240
[58] Field of Search ...................... 524/229, 232, 524/271, 274, 487, 488, 489, 490, 491, 505, 504; 525/74, 92, 93, 98, 99, 210, 211, 216, 240, 95, 64

[56] References Cited

U.S. PATENT DOCUMENTS

| | | |
|---|---|---|
| 3,723,035 | 3/1973 | Franke et al. . |
| 3,779,785 | 12/1973 | Stiles et al. . |
| 4,359,492 | 11/1982 | Schlademan .............................. 524/274 |
| 4,369,284 | 1/1983 | Chen . |
| 4,510,281 | 4/1985 | Smith ........................................ 524/229 |
| 4,511,696 | 4/1985 | Durbin et al. . |
| 4,576,835 | 3/1986 | Gardenier et al. . |
| 4,618,213 | 10/1986 | Chen . |
| 4,645,537 | 2/1987 | Gardenier et al. . |
| 4,748,796 | 6/1988 | Viel et al. . |
| 4,755,245 | 7/1988 | Viel et al. . |
| 4,774,138 | 9/1988 | Gardenier et al. ....................... 428/407 |
| 5,057,571 | 10/1991 | Malcolm et al. ......................... 524/505 |
| 5,090,861 | 2/1992 | Malcolm et al. ........................... 525/98 |
| 5,153,254 | 10/1992 | Chen . |
| 5,206,292 | 4/1993 | Hwo et al. ................................ 525/240 |
| 5,239,723 | 8/1993 | Chen . |
| 5,257,491 | 11/1993 | Rouyer et al. . |
| 5,262,468 | 11/1993 | Chen . |
| 5,324,222 | 6/1994 | Chen . |
| 5,334,646 | 8/1994 | Chen . |
| 5,373,682 | 12/1994 | Hatfield et al. . |
| 5,508,334 | 4/1996 | Chen . |

FOREIGN PATENT DOCUMENTS

| | | |
|---|---|---|
| 0 115 307 A2 | 1/1984 | European Pat. Off. . |
| 0 410 914 A1 | 7/1990 | European Pat. Off. . |
| 0 575 900 A1 | 6/1993 | European Pat. Off. . |
| 2544654 | 10/1984 | France . |
| 2601616 | 10/1988 | France . |
| 2248046 | 4/1974 | Germany . |
| 3234065 | 4/1983 | Germany . |
| 3138222 | 5/1983 | Germany . |
| 3625358 | 2/1988 | Germany . |
| 2 142 255 | 1/1985 | United Kingdom . |
| WO 95/23823 | 9/1995 | WIPO . |
| WO 96/00747 | 1/1996 | WIPO . |

OTHER PUBLICATIONS

1 Page Derwent English Abstract on EP 0 575 900.

*Primary Examiner*—Peter A. Szekely
*Attorney, Agent, or Firm*—Nancy N. Quan; Lisa R. Ryan; Carolyn A. Fischer

[57] ABSTRACT

A polymeric composition in pellet form comprising a tacky hot melt composition, comprising a) from about 5% by weight to about 90% by weight of a thermoplastic polymer, b) from about 0% by weight to about 65% by weight of a tackifying resin, c) from about 0% to about 50% by weight of a plasticizer, d) up to about 2% by weight of an antioxidant, and a pelletizing aid, wherein the tacky hot melt composition has some minimum amount of tackifier or plasticizer and is a pressure sensitive adhesive having a storage modulus, G', at about 25° C., of less than about $5 \times 10^6$ dynes/cm², and each pellet has a substantially tack-free surface.

This invention further discloses a polymeric composition in pellet form suitable for molding articles. The composition comprises a tacky hot melt composition comprising at least one high molecular weight triblock copolymer of the general configuration A-B-A and a plasticizer and a pelletizing aid. The pelletizing aid substantially surrounds the tacky composition such that the molded articles are substantially free from surface tack.

A method of forming the pellets is also disclosed.

28 Claims, 4 Drawing Sheets

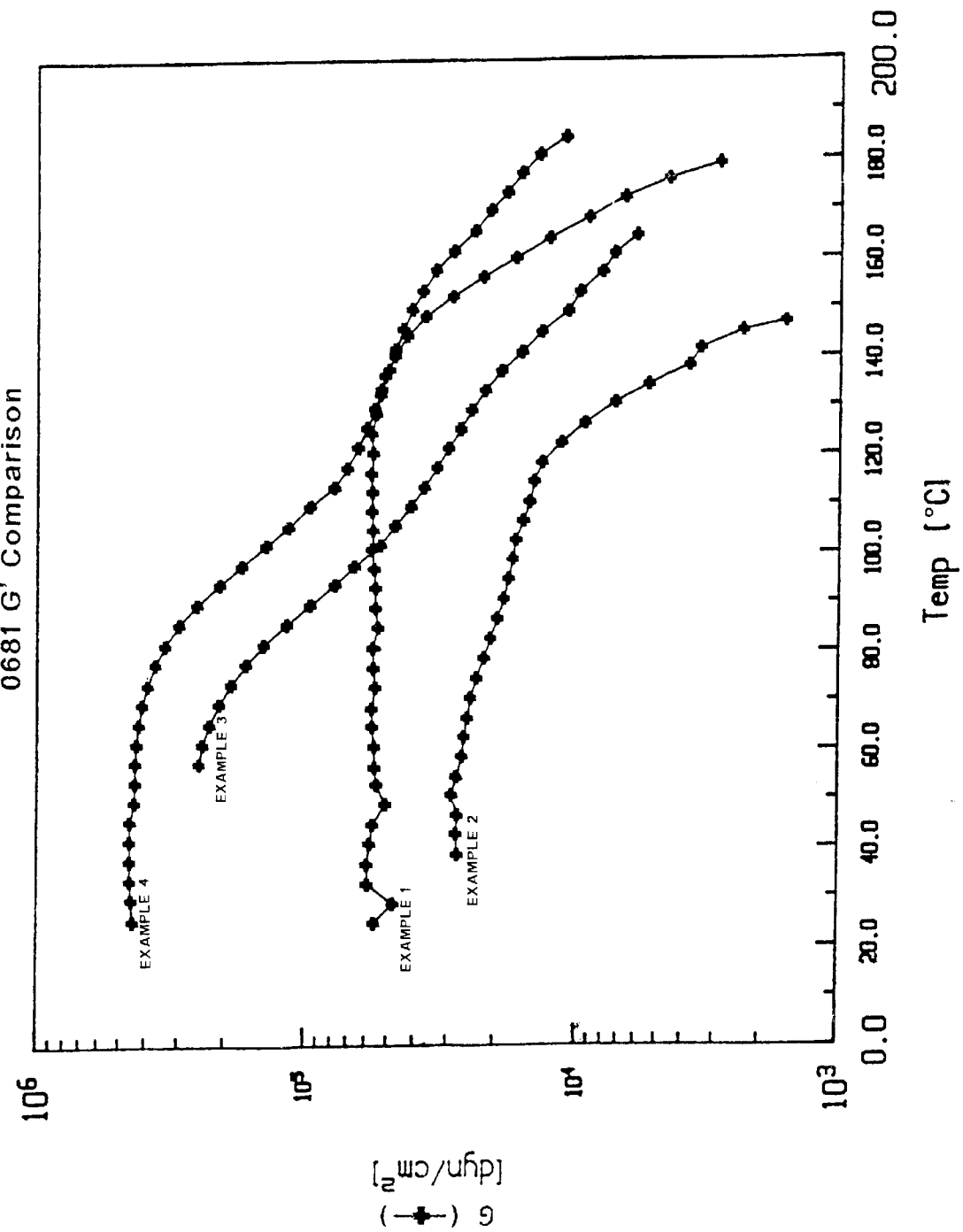

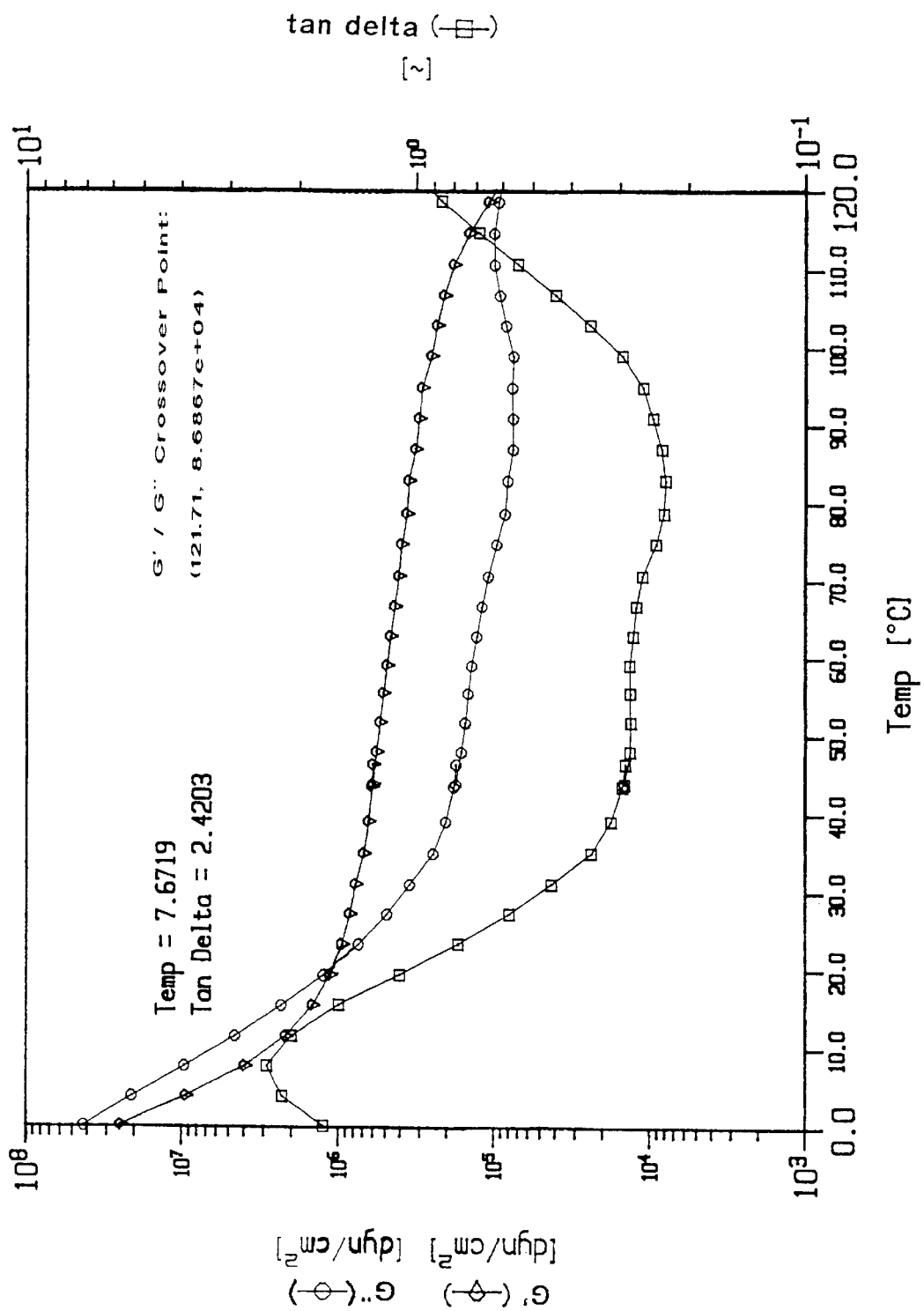
FIGURE 2 - EXAMPLE 5

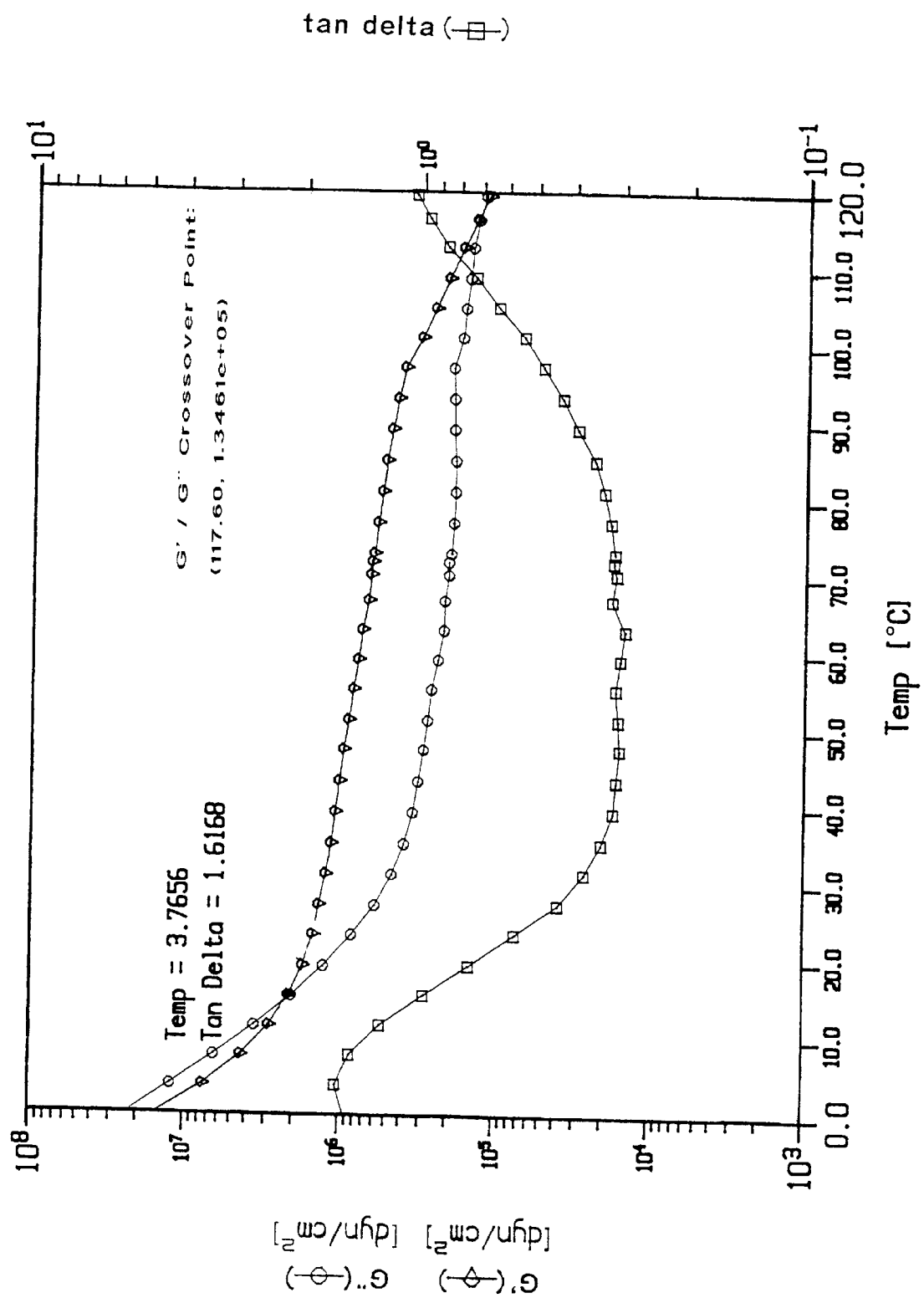
FIGURE 3 - EXAMPLE 6

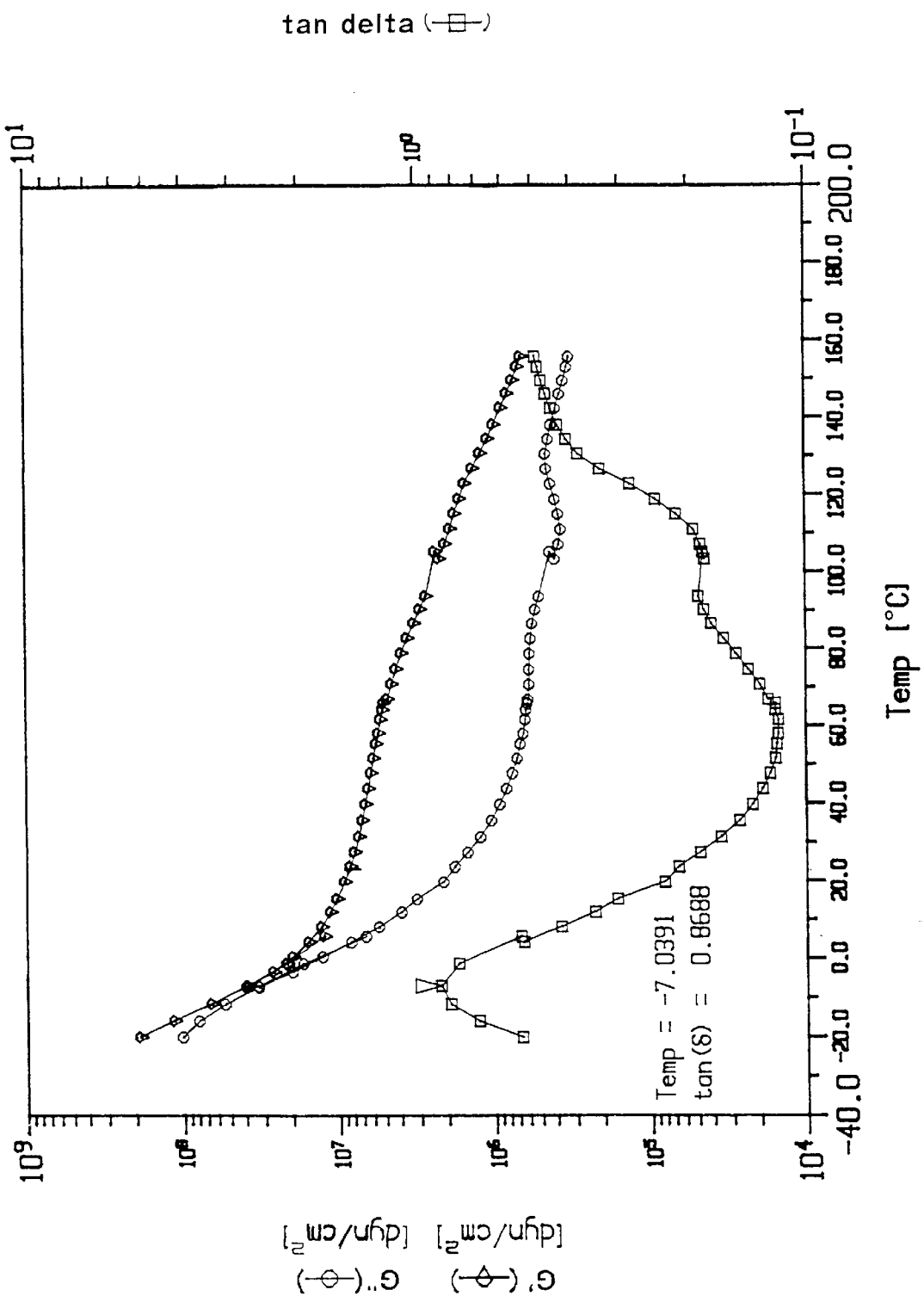
FIGURE 4 - COMPARATIVE EXAMPLE A

POLYMERIC COMPOSITION IN PELLET FORM

CROSS-REFERENCE TO RELATED APPLICATION

This application is a continuation-in-part of U.S. patent application Ser. No. 08/559,006 filed Nov. 16, 1995, now abandoned, incorporated herein by reference.

FIELD OF THE INVENTION

This invention relates to a polymeric composition in pellet form comprising a tacky hot melt composition which can be used either for hot melt pressure sensitive applications or for molded articles. These compositions suitable are defined by having a storage modulus, G', at 25° C., of less than about $5 \times 10^6$ dynes/cm$^2$, and each pellet has a substantially tack-free surface prior to melting, and pressure sensitive characteristics after resolidification. The polymeric compositions suitable for use in injection molding preferably comprise a high molecular weight block copolymer and have a tack-free surface both prior to melting the pellets, and after melting and resolidification.

BACKGROUND OF THE INVENTION

Tacky hot melt compositions have been used widely in the adhesive industry for a wide range of applications such as for pressure sensitive adhesives due to their ability to adhere to a wide variety of substrates. A primary property of a hot melt pressure sensitive composition is that it remain tacky at room temperature so that it may be adhered to substrates when it has completely cooled from its molten state. Examples of applications which require this property are tape and label applications. Paper, polyethylene, polypropylene or other such substrates may be coated with the tacky hot melt composition, covered with release liner, and then shipped this way for later applications such as for labels used on various containers, books, magazines, or envelopes just to name a few.

The use of tacky hot melt compositions in other applications has been precluded by the fact that they remain tacky. Yet it may be desirable to use these soft and very flexible compositions for other applications. One such application is the formation of articles by injection molding. Some articles formed by injection molding include shoe soles, drum pads, therapeutic hand exercising grips, shock absorbers, acoustical insulators, chair pads and imitation skin for use in the entertainment industry but this list is not exhaustive.

The tackiness exhibited by these hot melt pressure sensitive adhesives also makes them difficult to handle. They may adhere to skin, clothing, application equipment, floors, or other places that are undesirable. Many packaging methods have been devised to avoid the problems encountered in the handling of these hot melt pressure sensitive compositions.

Hot melt adhesives are supplied as pellets, pillows as disclosed by German Pat. 22 48 046, slats or chicklets, blocks, and cakes.

A further problem encountered with hot melt pressure sensitive adhesives is that the tackiness may result in blocking individual pieces together resulting in a large mass in the shipping containers. This makes it difficult to get the adhesive into many different types of hot melt premelter tanks used in the industry.

U.S. Pat. No. 3,723,035 discloses a machine performing an improved method of packaging a hot melt adhesive. This produces an end product known as pillows to one of skill in the art. These pillows can be coextruded with a non-tacky polymer such as polyethylene for producing pressure sensitive adhesives that are tacky at room temperature. This coextrusion coating prevents the pillows from blocking together in a solid mass at room temperature. Using this method, once the coextruded pillows are melted for use on an application line, the hot melt composition again becomes tacky when it returns to room temperature.

French Pat. No. 2,544,654 published Oct. 26, 1984 discloses forming a tackless hot melt by adding the molten hot melt to a mold which contains a preformed support layer having a transfer film which is compatible with the hot melt.

U.S. Pat. Nos. 4,748,796 issued Jun. 7, 1988 and 4,755,245 issued Jul. 5, 1988 disclose forming a protective coating for an adhesive material by electrostatically coating a mold or cavity with a powder screen and then pouring hot melt into the mold.

French Pat. No. 2,601,616 published Oct. 22, 1988 discloses forming blocks of hot melt pressure sensitive adhesive by casting the adhesive into molds precoated by spraying with a film of non self-sticking hot melt material.

German Pat. Nos. DE 31 38 222, DE 32 34 065, and DE 36 25 358 teach coating or wrapping a formed hot melt block with various types of film.

U.S. Pat. No. 5,257,491 to Rouyer et al. teaches a method of packaging a hot melt adhesive composition wherein the adhesive composition is sufficiently solidified or when flowable.

U.S. Pat. No. 5,401,455 to Hatfield et al. issued Mar. 28, 1995 teaches a method for packaging hot melt adhesive compositions comprising the use of a mold being in contact with a refrigerant gas or liquid heat sink. Hatfield teaches that when a hot melt adhesive is poured into a cavity lined with film in its molten state, the adhesive is fused to some extent with the film. According to Hatfield, this in turn allows some mixing and compatibilizing of the film, improving the opportunity for more complete mixing.

U.S. Pat. No. 5,057,571 to Malcolm et al. discloses at column 8 line 59 to column 9 line 14 a method for pelletizing a preblend of a radial block copolymer and a tackifying resin. This preblend is then used to make hot melt adhesives for disposable article construction. The preblend is manufactured on an extruder. The pelletized preblend was then used to make an adhesive using conventional hot melt mixers. This is a two step process of making hot melt pressure sensitive adhesives, and it was never intended to teach making a finished product in a free-flowing pellet form.

The current inventors have found a polymeric composition in a free-flowing pellet form that can be either a hot melt pressure sensitive adhesive or a polymeric composition that has a surface that remains tack-free after melting and resolidification.

SUMMARY OF THE INVENTION

The present invention discloses a polymeric composition in pellet form, comprising:

I. from about 97 to about 99.9 percent by weight of a tacky hot melt composition, comprising:
  a) from about 5% to about 90% by weight of a thermoplastic polymer;
  b) from about 0% to about 65% of a tackifying resin;
  c) from about 0% to about 50% by weight of a plasticizer; and
  d) up to about 2% of an antioxidant; and II. from about 0.1% to about 3% by weight of a pelletizing aid, wherein the composition comprises some minimum amount of tackifier or plasticizer or both.

The tacky hot melt composition is a pressure sensitive adhesive having a storage modulus, G', at 25° C., of less than about $5 \times 10^6$ dynes/cm², as measured using a Rheometrics Scientific Dynamic Mechanical Spectrometer Model #RDS7700.

The pelletizing aid is used to provide hot melt pressure sensitive adhesives in pellet form wherein the pellet has a tack-free surface. Once the pellets are melted and resolidified, these compositions once again return to their original tacky state. These pellets are free-flowing and the resultant pelletized composition can be used in various tape and label applications, in non-woven applications where pressure sensitive adhesives are used such as for positioning of feminine napkins, diaper fastening systems, and disposable article construction, in the automotive industry where hot melt pressure sensitive adhesives are used for assembly applications, and for medical applications.

The present invention further discloses a polymeric composition in pellet form, comprising:

I. from about 97 to about 99.9 percent by weight of a tacky hot melt composition, comprising:
   a) from about 2.0 to about 20 percent by weight of a block copolymer having the general configuration A-B-A and a molecular weight greater than about 200,000;
   b) from about 20 to about 98 percent by weight of a compatible plasticizer; and
   c) from about 0% to about 30 percent by weight of a compatible block copolymer;

II. from about 0.1% to about 3 percent by weight of a pelletizing aid.

The resultant polymeric compositions have a tack-free surface both prior to melting the pellets, and after melting and resolidification.

The resultant tacky hot melt compositions are characterized by a specific gravity of greater than about 0.8, Mettler Softening Points of greater than about 90° C. and Bloom Gelometer readings of greater than about 20 grams.

The pellets thus formed are soft, non-blocking, substantially without surface tack and exhibit an elastic rebound, as characterized by G' (elastic or storage modulus) measurements. These compositions are suitable for use in molding, especially injection molding. Any molded products produced therefrom also retain the substantially tack-free surface. While the bulk composition determines the properties of the pellets, the pelletizing aid determine the surface properties of the pellets, and has no effect on the bulk properties.

These pellets are suitable for use in molding, especially injection molding. The composition suitable for such processes comprises:

I. A tacky hot melt composition, comprising:
   a) at least one high molecular weight triblock copolymer of the general configuration A-B-A; and
   b) a plasticizer; and II. A pelletizing aid, wherein said pelletizing aid substantially surrounds the tacky composition such that the molded articles are soft, non-blocking and have a substantially tack-free surface. Optionally, other compatible block copolymers such as radial blocks and diblocks and other triblocks can be added. Preferably, the tacky hot melt composition comprises from about 97 to about 99.9 percent by weight of the article, more preferably from about 99 to about 99.9 percent by weight.

Any molded articles produced therefrom also retain the substantially tack-free surface and rebound properties. Such articles can include drum pads useful as acoustical pads for vibration damping, disc players, ear phones, percussion surfaces on electronic drum kits and so on; soles, shoes insoles, in-line skate soles and so on; pads for use in athletic gear such as mouth pads, protective guards, encapsulants for other solid protective pads and so on; bicycle seats, gloves, bicycle shorts and so on; medical equipment such as pads for wheel chairs, donut-shaped pads for seats and so on; furniture pads such as mattress pads, chair pads and so on; special effects articles such as body parts, Santa Claus' bellies, synthetic skin, and others that are useful in movies; and bandages, especially for burn wounds. While the rest of the composition determines the overall bulk properties of the pellets and articles molded therefrom, the pelletizing aid determines the surface properties of not only the pellets, but the articles made from such pellets.

The present invention also discloses an under-water pelletizing process for making the tacky hot melt compositions in pellet form, utilizing a pelletizing aid to produce pellets that have a substantially tack-free surface making them non-blocking, and are soft. The process varies slightly for each product, dependent mainly on the plasticizer loading, and comprises the steps of:

a) blending the hot melt components to form a substantially homogeneous hot melt mixture;

b) forcing said substantially homogeneous hot melt mixture through a die for forming substantially homogeneous hot melt ribbons and forming resultant pellets therefrom;

c) solidifying said pellets by use of a cooling medium; and d) applying said pelletizing aid at some point during the pelletizing process.

The pellets can be made into any convenient size. Preferably, the pellets are substantially spherical, with sizes ranging from about ⅛ to about ⅜ inch (about 3 mm to about 10 mm) in diameter for easy handling. The pellets can also be ellipsoidal and cylindrical. The preferred dimensions for these shapes can range from about 3 mm to about 10 mm to about 10 mm by 20 mm.

DETAILED DESCRIPTION OF THE PREFERRED EMBODIMENTS

The pelletized polymeric compositions of the present invention can exhibit a spectrum of properties, ranging from compositions having hot melt pressure sensitive adhesive properties to compositions suitable for molding non-tacky articles. These polymeric compositions have a storage modulus, G', at 25° C. of less than about $5 \times 10^6$ dynes/cm², and preferably have a storage modulus, G', at about 25° C., from about $1 \times 10^4$ to about $5 \times 10^6$ dynes/cm² while those useful for molding applications can have a storage modulus of greater than about $5 \times 10^6$ dynes/cm². The storage modulus, G', is measured using a Rheometrics Scientific Dynamic Mechanical Spectrometer Model #RDS7700.

The thermoplastic polymers useful for the present invention can include A-B-A triblock copolymers, A-B diblock copolymers, A-B-A-B-A-B multiblock copolymers, radial block copolymers and grafted versions thereof; homopolymers, copolymers and terpolymers of ethylene; and homopolymers, copolymers and terpolymers of propylene; and mixtures thereof. Radial block copolymers include Y-block and star polymers as well as other configurations. The A-B-A block copolymers useful herein are those described in U.S. Pat. No. 4,136,699 to (Collins et al.), incorporated herein by reference, issued Jan. 30, 1979. Examples include those polymers available under the Kraton™ G series from Shell Chemical Co. in Houston, Tex. There are various grades available including Kraton™ G-1726, Kraton™ G-1650, Kraton™ G-1651, Kraton™ G-1652, Kraton™ G-1657, all saturated A-B diblock/A-B-A triblock mixtures with ethylene/butylene midblocks; Kraton™ D-1112 a high percent A-B diblock linear styrene-isoprene-styrene polymer; Kraton™ D-1107 and Kraton™ D-1111, primarily A-B-A triblock linear styrene-isoprene-styrene block copolymers; Kraton D4433X, a linear styrene-isoprene-styrene (SIS) block copolymer with an oil content of 30% by weight and Kraton D1184, a high molecular weight styrene-butadiene-styrene (SBS) block copolymer both available from Shell Chemical Co.; Stereon™ 840A and Stereon™ 841A, A-B-A-B-A-B multiblock SBS block copolymers available from Firestone in Akron, Ohio; Europrene™ Sol T-193B, a linear SIS block copolymer available from Enichem Elastomers in New York, N.Y.; Europrene™ Sol T-190, a linear styrene-isoprene-styrene block copolymer and Europrene™ Sol T-163, a radial SBS block copolymer both also available from Enichem Elastomers; Vector™ 4461-D, a linear SBS block copolymer available from Exxon Chemical Co. in Houston, Tex.; Vector™ 4111, 4211 and 4411, fully coupled linear SIS block copolymers containing different weight percentages of styrene endblock; and Vector™ 4113, a highly coupled linear SIS block copolymer also available from Exxon Chemical Co.; and DPX-550, DPX-551 and DPX-552 radial SIS block copolymers available from Dexco Polymers in Houston, Tex. This list in not exclusive and there are numerous grades of block copolymers available from various sources for hot melt pressure sensitive adhesives. These polymers may be used alone, or in any combinations. These polymers are useful from about 5% to about 90% by weight in the polymeric composition.

The polymeric compositions suitable for molding applications may comprise any of the above mentioned polymers which have a high molecular weight and preferably have a weight average molecular weight greater than about 200,000 as measured by Gel Permeation Chromatography, with values reported relative to styrene standards. The polymer is preferably a substantially linear copolymer having the general configuration A-B-A. wherein the A block can be polystyrene and the B block can be ethylene-butylene, ethylene-propylene, isoprene, butadiene or mixtures thereof, and preferably the B block is ethylene-butylene or ethylene-propylene. Polymers of this type, such as Kraton™ G-1651, are twice the molecular weight of conventional styrene-ethylene/butylene-styrene (S-EB-S) block copolymers used in the hot melt adhesive industry. This copolymer is present in amounts from about 2 to about 20 percent by weight and preferably from about 5 to about 20 percent by weight in the polymeric composition.

Other lower molecular weight block copolymers may be utilized with these high molecular weight block copolymers. Some examples are A-B-A triblock copolymers, A-B diblock copolymers, A-B-A-B-A-B multiblock copolymers, radial block copolymers, and grafted versions of such copolymers including Shell Chemical's TKG-101 and RP-6912. Such A-B-A block copolymers are disclosed in Collins et al., U.S. Pat. No. 4,136,699. Some of these block copolymers are commercially available from Shell Chemical Co. under the Kraton™ G series which are S-EB-S block copolymers.

Other useful polymers include atactic polyalphaolefins such as those available from Rexene Products Co. in Dallas, Tex. under the tradename of Rextac™ such as RT-2280 and RT-2315 and RT-2585 having various amounts of ethylene and homogeneous linear or substantially linear interpolymers of ethylene with at least one $C_2$ to $C_{20}$ alphaolefin, further characterized by each said interpolymer having a polydispersity less than about 2.5 including such polymers as Exact™ 5008, an ethylene-butene copolymer, Exxpol SLP-0394™, and ethylene-propylene copolymer, Exact™ 3031, an ethylene-hexene copolymer, all available from Dow Chemical Co. in Midland, Mich. These polymers may have to be used in small concentrations if utilized with such block copolymers as Kraton™ G-1651 to maintain compatibility without phase separation or snotty, gel-like compositions. These concentrations may be as low as 5% by weight in the composition.

Other compatible polymers may be useful in the polymeric compositions of the present invention including ethylene vinyl acetate copolymers such as Elvax™ 410, a 14% vinyl acetate/400 melt index copolymer and Elvax™ 210, a 28% vinyl acetate/400 melt index copolymer, both available from DuPont Chemical Co. in Wilmington, Del.; Escorene™ UL 7505 an ethylene vinyl acetate copolymer available from Exxon Chemical Co.; Ultrathene™ UE 64904 available from Quantum Chemical Co., U.S.I. Division in Cincinnati, Ohio; and AT 1850M available from AT Polymers & Film Co. in Charlotte, N.C. Copolymers of ethylene and methyl acrylate (methacrylates as well as acrylates) are also useful including Optema™ TC-140, XS-93.04 and TC-221 available from Exxon Chemical Co.; Lotryl™ 28 MA 175 and 35 MA 05 1000 available from Elf Atochem North America in Philadelphia, Pa. Ethylene methyl acrylate copolymers are also available from Chevron under the tradename of Emac™ and from Quantum Chemical Co. under the tradename of Acrythene™. Copolymers of ethylene and n-butyl acrylate are also useful in the adhesives of the invention. They are available from Quantum Chemical Co. under the tradename of Enathene™ including EA80808, EA 89821 and EA89822; from Elf Atochem North America under the tradename of Lotryl™ including 35 BA 900 and 35 BA 1000; from Exxon Chemical Co. under the tradename of Escorene™ including XW-23.AH and XW-22. These polymers may also have to be used in small concentrations with some of the block copolymers such as Kraton™ G-1651.

The polymeric compositions may also comprise a tackifying resin. While they are preferable for use in hot melt pressure sensitive compositions, they may or may not be utilized in the molded article compositions. The tackifying resins useful herein include aliphatic, cycloaliphatic and aromatic hydrocarbons and modified hydrocarbons and hydrogenated derivatives; terpenes and modified terpenes and hydrogenated derivatives; rosins and modified rosins and hydrogenated derivatives; and mixtures thereof. These tackifying resins have a ring and ball softening point of between about 70° C. and 150° C. They are also available with differing levels of hydrogenation, or saturation which is another commonly used term. Useful examples include Eastotac™ H-100, H-115 and H-130 from Eastman Chemical Co. in Kingsport, Tenn. which are partially hydrogenated cycloaliphatic petroleum hydrocarbon resins with different softening points. These are available in the E grade, the R grade, the L grade and the W grade. These have differing levels of hydrogenation from least hydrogenated to most hydrogenated. The E grade has a bromine number of 15, the R grade a bromine number of 5, the L grade has a bromine number of 3 and the W grade a bromine number of 1. There is also an Eastotac™ H-142R resin available. Other useful tackifying resins include Escorez 1310 LC, an aliphatic hydrocarbon resin, Escorez™ 5300 and Escorez™ 5400, partially hydrogenated cycloaliphatic petroleum hydrocarbon resins, and Escorez™ 5600, a partially hydrogenated aromatic modified petroleum hydrocarbon resin all available from Exxon Chemical Co. in Houston, Tex.; Wingtack™ Extra which is an aliphatic, aromatic petroleum hydrocarbon resin available from Goodyear Chemical Co. in Akron, Ohio; Hercolite™ 2100 which is a partially hydrogenated cycloaliphatic petroleum hydrocarbon resin available from Hercules in Wilmington, Del.; and Zonatac™ 105 Lite which is a styrenated terpene resin made from d-limonene and available from Arizona Chemical Co. in Panama City, Fla. There are numerous types of rosins and modified rosins available with differing levels of hydrogenation including gum rosins, wood rosins, tall-oil rosins, distilled rosins, dimerized rosins and polymerized rosins. Some specific modified rosins include glycerol and pentaerythritol esters of wood rosins and tall-oil rosins. Commercially available grades include, but are not limited to, Sylvatac™ 1103, a pentaerythritol rosin ester available from Arizona Chemical Co., Unitac™ R-100 Lite a pentaerythritol rosin ester from Union Camp in Wayne, N.J., Zonester™ 100, a glycerol ester of tall oil rosin from Arizona Chemical Co., Permalyn™ 305, a pentaerythritol modified wood rosin available from Hercules, Inc. in Wilmington, Del. and Foral™ 105, which is a highly hydrogenated pentaerytbritol rosin ester available. Sylvatac™ R-85 which is an 85° C. melt point rosin acid and Sylvatac™ 295 which is a 95° C. melt point rosin acid are both available from Arizona Chemical Co. Foral™ AX is a 75° C. melt point hydrogenated rosin acid available from Hercules Inc. Nirez™ V-2040 is a phenolic modified terpene resin available from Arizona Chemical Co. There are many available types and grades of tackifying resins available from many companies, and one skilled in the art would recognize that this is not an exclusive list, and that the available tackifying resins are too numerous to list here. Various endblock resins are also useful in the compositions of the present invention. These include Endex™ 160, an aromatic hydrocarbon manufactured by Hercules, Inc. in Wilmington, Del.; Kristalex™ 3100 and Kristalex™ 5140, alphamethyl styrene hydrocarbons manufactured by Hercules, Inc.; and also coumarone indene resins. These tackifiers are useful from about 0% to about 65% by weight, and preferably from about 10% to about 65%.

The plasticizers useful in the present invention may include mineral based oils and petroleum based oils, liquid resins, liquid elastomers, polybutene, polyisobutylene, functionalized oils such as glycerol trihydroxyoleate and other fatty oils and mixtures thereof. A plasticizer is broadly defined as a typically organic composition that can be added to the thermoplastics, rubbers and other resins to improve extrudability, flexibility, workability and stretchability in the finished adhesive. Any material which flows at ambient temperatures and is compatible with the block copolymer may be useful.

The most commonly used plasticizers are oils which are primarily hydrocarbon oils that are low in aromatic content and are paraffinic or naphthenic in character. The oils are preferably low in volatility, transparent and have as little color and odor as possible. This invention also contemplates the use of olefin oligomers, low molecular weight polymers, vegetable oils and their derivatives and similar plasticizing oils.

Examples of useful plasticizers include Calsol™ 5120, a naphthenic petroleum based oil available from Calumet Lubricants Co. in Indianapolis, Ind.; Kaydol™ White Mineral Oil, a paraffinic mineral oil available from Witco Corp. in New York, N.Y.; Parapol™ 1300, a liquid butene homopolymer available from Exxon Chemical Co. in Houston, Tex.; Indopol™ H-300, a liquid butene homopolymer, available from Amoco Corp. in Chicago, Ill.; Escorez™ 2520, a liquid aromatic petroleum based hydrocarbon resin with a pour point of 20° C., available from Exxon Chemical Co.; Regalrez™ 1018, a liquid hydrogenated aromatic hydrocarbon resin with a pour point of 18° C., available from Hercules, Inc. in Chicago, Ill.; and Sylvatac™ 5N, a liquid resin of modified rosin ester with a pour point of 5° C., available from Arizona Chemical Co. in Panama City, Fla. One skilled in the art would recognize that any generic 500 second or 1200 second naphthenic process oil would also be useful. These plasticizers are useful in amounts from about 0% to about 50% by weight for the hot melt pressure sensitive compositions, and up to about 98% by weight in the molded article compositions, and preferably up to about 90% by weight.

A pelletizing aid is used to change the surface characteristics of the pellets. It would be generally undesirable for molded articles manufactured by such methods as injection molding, to remain tacky. Surprisingly, a small amount of pelletizing aid can make the surface of the pellets substantially non-tacky. The pelletizing aids do not change the end use properties of the tacky composition, as in the formulas used as hot melt pressure sensitive adhesives, or they do change the physical properties of the tacky composition, as in the case of the formulas used for the molding applications.

The pelletizing aid is selected from the group consisting of polyethylene waxes, modified polyethylene waxes, polyamide waxes and stearamide waxes. Many other waxes or pelletizing aids not on this list could also be useful provided the surface of the resultant pellet is tack-free. Preferred waxes are Acrawax C™ stearamide wax available from Lonza, Inc. in Fairlawn, N.J.; Castor™ hydroxy waxes and Paricin™ hydroxyamide waxes available form Caschem in Bayonne, N.J.; Neptune™ 968 available from Shamrock Technologies in Newark, N.J.; Sharnrock™ S-395 polyethylene wax available from Shamrock Technologies; and Hoechst™ Wax PED 121, a modified polyethylene available from Hoechst Celanese in Somerville, N.J. More preferably, these pelletizing aids are polyethylene waxes and come in powder form. The pelletizing aid is present from about 0.1 percent to about 3 percent by weight and preferably from about 0.1 percent to about 1 percent by weight. This amount is substantially less or comparable to the packaging film of prior art packaging methods. It is believed that the temperature of use of the tacky hot melt composition controls whether the surface of tacky hot melt composition returns to the substantially tack-free state after melting the pellets, and subsequent resolidification.

A stabilizer or antioxidant can also be used in the polymeric compositions. These compounds are added to protect the adhesive from degradation caused by reaction with oxygen induced by such things as heat, light or residual catalyst from the raw materials such as the tackifying resin. Such antioxidants are commercially available from Ciba-Geigy in Hawthorne, N.Y. and include Irganox™ 565, Irganox™ 1010 and Irganox™ 1076, all hindered phenolic antioxidants. These are primary antioxidants which act as free radical scavengers and may be used alone or in combination with other antioxidants such as phosphite antioxidants like Irgafos™ 168 available from Ciba-Geigy. Phosphite antioxidants are considered secondary antioxidants, are primarily used as peroxide decomposers and are generally not used alone, but are instead used in combination with other antioxidants. Other available antioxidants are Cyanox™ LTDP, a thioether antioxidant, available from Cytec Industries in Stamford, Conn., Ethanox™ 330, a hindered phenolic antioxidant, available from Albemarle in Baton Rouge, La. Many other antioxidants are available for use by themselves, or in combination with other antioxidants. These compounds are added to the hot melts in small amounts, up to about 2% by weight in the hot melt pressure sensitive adhesive, and have no effect on the physical properties of the adhesive.

Other compounds that also could be added that have no effect on the physical properties are pigments which add color, fluorescing agents, any compounds that mask odor and fillers to mention only a few. Additives such as these are known to one of skill in the art.

Fillers come in the form of particulate matter, fibers and powders, or may be any material that does not interfere with the other components in the adhesive. Some examples include calcium carbonate, ceramics, glass, silica, quartz, mica, treated clay, titanium dioxide, boron nitrides, graphite, carbon black, metals, barium, sulfate, talc and mixtures thereof. Such additives are known to one of skill in the art.

As discussed above, the resultant pellets are soft, non-blocking, substantially free from surface tack and exhibit an elastic rebound. This last characteristic can be measured by the elastic or storage modulus, G'. The higher the modulus, the more likely that the material will return to its original shape. At lower loadings of the high molecular weight triblock copolymer, the pellets formed resemble gels. They possess some elastic rebound, but tend to retain the same physical property over a wide-temperature range, or over a long period of time. These pellets are desirable for making articles such as Santa Claus' bellies. At higher loadings of the copolymer, the pellets formed have high elastic modulus and tend to return to their original shape faster. They are more suited for producing articles such as drum pads.

Compatible polymers or copolymers discussed above can also be added to modify the properties of the pellets. These are generally of low molecular weight, and pellets made with an amount of the high molecular weight triblock copolymer tend to have more rebound than those made with the same amount of a blend of this copolymer and the low molecular weight compatible polymer or copolymer. These compatible polymers or copolymers are thus added for customizing the final applications or uses.

These pellets are suitable for use in molding, especially injection molding. The composition suitable for such processes comprises:

I. A tacky hot melt composition, comprising:
    a) at least one high molecular weight triblock copolymer of the general configuration A-B-A; and
    b) a plasticizer; and
II. A pelletizing aid;

wherein said pelletizing aid substantially surrounds the tacky composition such that the molded articles are soft, non-blocking and substantially without surface tack. Optionally, other polymers such as diblock or other triblocks can be added. Preferably, the tacky hot melt composition comprises from about 97 to about 99.9 percent by weight of the article, more preferably from about 99 to about 99.9 percent by weight.

Any molded articles produced therefrom also retain the substantially tack-free surface and rebound properties. Such articles can include drum pads useful as acoustical pads for vibration damping, disc players, ear phones, percussion surfaces on electronic drum kits and so on; soles shoes insoles, in-line skate soles and so on; pads for use in athletic gear such as mouth pads, protective guards, encapsulants for other solid protective pads and so on; bicycle seats, gloves, bicycle shorts and so on; medical equipment such as pads for wheel chairs, donut-shaped pads for seats and so on; furniture pads such as mattress pads, chair pads and so on; special effects articles such as body parts, Santa Claus' bellies, and other that are useful in movies. Unlike the prior art, the pelletizing aid used herein blooms to the surface during the molding process, such that it substantially completely surrounds the tacky composition below and produces articles substantially free of surface tack when cooled. This is surprising because the amount of pelletizing aid used in the formulation is small, and according to prior art teachings, should not substantially interfere with the properties of the bulk composition, nor should it change the surface properties.

The present invention further discloses a method for making such pellets for all the formulations of the invention. The manufacturing process can vary slightly for each product depending on the plasticizer loading. The current process requires multiple passes through a co-rotating twin screw extruder with the product being pelletized at the end of each pass, and then refed into the extruder for the further addition of plasticizer. The compositions with 90 percent plasticizer or more need three passes, while lower plasticizer loadings may require only two. It is important to note that the materials are pelletized with the pelletizing aid after both passes. The concentration of the pelletizing aid in the water can range from about 0.1 percent to about 3 percent by weight, preferably about 0.1 to about 1 percent by weight based on anticipated production rate for each pass. A specific preferred manufacturing process comprises:

a) blending the hot melt components to form a substantially homogeneous hot melt mixture;
    b) forcing said substantially homogeneous hot melt mixture through a die having a series of voids in a circular pattern to form a series of substantially homogeneous hot melt ribbons;
    c) further forcing said homogeneous hot melt ribbons past rotating blades in substantially parallel position to said die, cutting said substantially homogeneous hot melt ribbons to form resultant pellets;
    d) substantially solidifying said pellets by use of a liquid cooling medium said liquid cooling medium containing a pelletizing aid, being circulated past said die and rotating blades on the side where said substantially homogeneous hot melt ribbons emerge;
    e) transporting said hot melt pellets to a drying area;
    f) substantially removing liquid from said hot melt pellets by blowing.

As depicted above, the pelletizing aid is present in the cooling medium. It can also be added to the hot melt composition prior to blending or during the pelletizing steps by cofeeding a solution of pelletizing aid with the hot melt composition.

As noted above, it is well known in the art that stabilizers or antioxidants can also be added to the compositions in small amounts and have no effect on the other physical properties of the compositions. Other compounds that could be added that also do not effect physical properties are pigments for color, fluorescing agents, and any compounds that mask odor. Additives such as these are known to one of skill in the art.

This invention is further illustrated by the following non-limiting examples.

EXAMPLES

Test Methods

1. Melt Viscosities

The melt viscosities of the hot melt adhesives were determined on a Brookfield Thermosel Viscosmeter Model DV-II+. using either a number 21 or 27 spindle.

2. Specific Gravity

The specific gravity was determined using test method ASTM D792 with isopropyl alcohol as the liquid.

3. Mettler Softening Point

The Mettler softening points are determined using test method ASTM D3461.

4. Dynamic Temperature Steps

Storage modulus, G', at 25° C. and Tg were determined using a Rheometrics Scientific Dynamic Mechanical Spectrometer Model # RDS7700. The parallel plates used had a 25 mm diameter and a 1.502 mm gap. The instrument was set to a frequency of 10 rads/sec and temperature sweep was performed from 180° C. to −50° C.

5. Bloom Gelometer

Rigidity of the samples was determined using a Precision Bloom Gelometer Catalog No. 68705.

Examples 1–4

The following compositions are provided for illustrative purposes only.

These examples illustrate the physical properties achieved with these types of hot melt compositions but there are many more compositions with differing physical characteristics.

Examples 1 and 2 illustrate the invention using only a high molecular weight block substantially linear A-B-A block copolymer. Examples 3 and 4 illustrate the use of a blend of a high molecular weight block copolymer and another block copolymer. These examples illustrate compositions that are useful for molded articles. The dynamic temperature steps are especially illustrative of this. See exhibit no. 1.

TABLE 1

| | Composition By Weight Percent | | | |
|---|---|---|---|---|
| Example | 1 | 2 | 3 | 4 |
| Kraton G1651 | 10.0 | 5.0 | 7.0 | 7.0 |
| Kraton G1650 | | 5.0 | 12.0 | 17.0 |
| Kaydol Oil | 89.5 | 89.5 | 80.0 | 75.0 |
| *Antioxidant | 0.1 | 0.1 | 1.0 | 0.5 |
| **Ultra Violet Absorber | 0.4 | 0.4 | | 0.5 |
| ***Pigment | | Minute Amount | Minute Amount | |

About 0.1% Shamrock S-395 polyethylene Pelletizing aid was added to each of the compositions.
*Either Irganox 1076 antioxidant or Irganox 1010 antioxidant or a blend of the two may be used.
**A blend of approximately half Tinuvin, a hindered amine 770 and half Tinuvin 328, a benzotriazole was used.
***Minute amounts of either Sudan Blue 670, Sudan Orange 220, or Sudan Yellow 146 or blends thereof may be used.

TABLE 2

| | | Physical Characteristics | | | |
|---|---|---|---|---|---|
| Example | Method Used | 1 | 2 | 3 | 4 |
| Specific Gravity | ASTM D792 | 0.86 | 0.85 | 0.86 | 0.86 |
| Density(#/gal) | ASTMD792 | 7.1 | 7.1 | 7.1 | 7.2 |
| Viscosity @ 325° F. | | 143,250 cp | 1,770 cp | | |
| Viscosity @ 350° F. | | 21,625 cp | 770 cp | | |
| Viscosity @ 375° F. | | 4,350 cp | 190 cp | | |
| Viscosity @ 400° F. | | 1,060 cp | 60 cp | | |
| Mettler Soften Pt (°F.) | ASTM D3461 | 282.8 ± 2.9 | 255.8 ± 0.3 | | |
| G' at 300° F. | RDS-Parallel Plates | 2.64E + 04 | 3.29E + 03 | 4.24E + 03 | 4.18E + 04 |
| G' at 200° F. | Frequency = 10 rad/s | 4.76E + 04 | 1.97E + 04 | 5.11E + 04 | 2.11E + 05 |
| G' at 77° F. | Initial Temp = 356° F. | 4.27E + 04 | 3.12E + 04 | 1.71E + 05 | 5.14E + 05 |
| Tg(upper)-°C.(°F.) | Initial Temp = 356° F. | | | 97.9(208.2) | 104.9(220.8) |
| Tg(lower)-°C.(°F.) | Initial Temp = 356° F. | −58.1(−72.6) | −55.5(−67.9) | −54.3(−65.7) | −56.9(−70.4) |

Examples 5 and 6 and Comparative Example A

Examples 5 and 6 illustrate compositions which may be used as hot melt pressure sensitive adhesives. Comparative example A is an example of a composition where G' falls outside the parameters specified for a hot melt pressure sensitive composition. From Table 4 it can be seen that it is necessary to raise the temperature to nearly 100° C. for G' to fall within the pressure sensitive range.

TABLE 3

| | Composition By Weight Percent | | |
|---|---|---|---|
| | 5 | 6 | A |
| Kraton D4433-X (Linear SIS) | 45.0 | | |
| Europrene Sol T190 (Linear SIS) | | 50.0 | |
| Kraton D-1184 (Radial SBS) | | | 50.0 |

TABLE 3-continued

| Composition By Weight Percent | | | |
|---|---|---|---|
| | 5 | 6 | A |
| Zonester 100 | 20.0 | | |
| Escorez 1310LC | 35.0 | | |
| Wingtack Extra | | 50.0 | |
| Zonatac 105 | | | 50.0 |
| Antioxidant | 0.2 | 0.2 | 0.2 |

About 0.1% Shamrock S-395 Pelletizing Aid was added to each of the Compositions.
Antioxidant Irganox 1010, hindered phenolic antioxidant.

TABLE 4

Rheology Data

| G' @ (dynes/cm$^2$) | Example 5 | Example 6 | Comparative A |
|---|---|---|---|
| (77° F.) 25° C. | 9.0 × 10$^3$ | 1.4 × 10$^6$ | 8.3 × 10$^6$ |
| (100° F.) 38° C. | 6.5 × 10$^3$ | 1.1 × 10$^6$ | 6.9 × 10$^6$ |
| (200° F.) 93° C. | 3.0 × 10$^3$ | 4.5 × 10$^6$ | 2.7 × 10$^6$ |
| (300° F.) 149° C. | 1.1 × 10$^4$ | | 7.5 × 10$^3$ |
| Tg (°C.) | 8 | 4 | −7.0 |

We claim:

1. A thermoplastic composition in pellet form comprising:
I. from about 97% to about 99.9% by weight of a pressure sensitive hot melt composition comprising:
   a) from about 5% by weight to about 90% by weight of a thermoplastic polymer;
   b) from about 10% by weight to about 65% by weight of a tackifying resin; and
   c) from 0 to about 50% by weight of a plasticizer; and
II. from about 0.1% to about 3% by weight of a pelletizing aid substantially surrounding said thermoplastic composition;
wherein the hot melt composition has a storage modulus, G', at about 25° C., ranging from about 1×10$^4$ dynes/cm$^2$ to about 5×10$^5$ dynes/cm$^2$, and each pellet has a substantially tack-free surface.

2. The thermoplastic composition of claim 1 wherein said thermoplastic polymer is selected from the group consisting of A-B-A triblock copolymer, A-B diblock copolymers, A-B-A-B-A-B multiblock copolymers, radial block copolymers, and grafted versions thereof; homopolymers, copolymers and terpolymers of ethylene; homopolymers, copolymers and terpolymers of propylene; and mixtures thereof.

3. The thermoplastic composition of claim 2 wherein said thermoplastic polymer is a homogeneous, substantially linear ethylene alpha olefin.

4. The thermoplastic composition of claim 1 wherein said tackifying resin is selected from the group consisting of aliphatic, cycloaliphatic and aromatic hydrocarbons and modified hydrocarbons and hydrogenated derivatives; terpenes and modified terpenes and hydrogenated derivatives; and rosins and modified rosins and hydrogenated derivatives; and mixtures thereof.

5. The thermoplastic composition of claim 1 wherein said plasticizer is selected from the group consisting of mineral oils, paraffinic oils, naphthenic oils, polybutene, polyisobutylene, liquid tackifying resin, liquid elastomers, functionalized oils, fatty oils, and mixtures thereof.

6. The thermoplastic composition of claim 1 wherein said pelletizing aid is selected from the group consisting of polyethylene waxes, modified polyethylene waxes, polyamide waxes and stearamide waxes, and mixtures thereof.

7. The thermoplastic composition of claim 1 wherein said pelletizing aid is a polyethylene wax.

8. The thermoplastic composition of claim 7 wherein said pelletizing aid is in powder form.

9. The thermoplastic composition of claim 1 wherein said thermoplastic polymer is a styrenic block copolymer having a styrene content from about 10% by weight to about 50% by weight and a midblock selected from the group consisting of isoprene, butadiene, ethylene/butylene and ethylene/propylene and a diblock content of less than about 90%.

10. The thermoplastic composition of claim 1 wherein said pellets are free-flowing.

11. The thermoplastic composition of claim 1 wherein said composition is pressure sensitive after melting and resolidification.

12. The thermoplastic composition of claim 1 wherein the storage modulus is less than about 2×10$^5$ dynes/cm$^2$.

13. The thermoplastic composition of claim 1 wherein the storage modulus is less than about 4×10$^4$ dynes/cm$^2$.

14. The thermoplastic composition of claim 1 wherein the storage modulus is less than about 3×10$^4$ dynes/cm$^2$.

15. The thermoplastic composition of claim 1 wherein the amount of pelletizing aid ranges from about 0.1% by weight to about 0.6% by weight.

16. A thermoplastic composition in pellet form comprising:
I. a thermoplastic composition comprising:
   a) at least one high molecular weight block copolymer having a weight average molecular weight greater than about 200,000;
   b) an effective amount of plasticizer such that the thermoplastic composition has a storage modulus ranging from about 1×10$^4$ dynes/cm$^2$ to about 5×10$^6$ dynes/cm$^2$; and
II. a pelletizing aid substantially surrounding said thermoplastic composition in pellet form;
wherein said composition has a tack-free surface both prior to melting the pellets and after melting and resolidification.

17. The thermoplastic composition of claim 16 wherein said plasticizer is selected from the group consisting of mineral oils, paraffinic oils, naphthenic oils, polybutene, polyisobutylene, liquid tackifying resin, liquid elastomers, functionalized oils, fatty oils, and mixtures thereof.

18. The thermoplastic composition of claim 16 wherein the high molecular weight block copolymer is present in an amount of about 2% by weight to about 20% by weight.

19. The thermoplastic composition of claim 16 wherein the plasticizer is present in an amount of about 20% by weight to about 98% by weight.

20. The thermoplastic composition of claim 16 wherein the plasticizer is present in amount of at least about three times that of the block copolymer.

21. The thermoplastic composition of claim 16 wherein the plasticizer is present in amount of at least about four times that of the block copolymer.

22. The thermoplastic composition of claim 16 wherein the plasticizer is present in amount of about nine times that of the block copolymer.

23. The thermoplastic composition of claim 16 wherein the storage modulus is less than about 5×10$^5$ dynes/cm$^2$.

24. The thermoplastic composition of claim 16 wherein the storage modulus is less than about 2×10$^5$ dynes/cm$^2$.

25. The thermoplastic composition of claim 16 wherein the storage modulus is less than about 4×10$^4$ dynes/cm$^2$.

26. The thermoplastic composition of claim 16 wherein the amount of pelletizing aid ranges from about 0.1% by weight to about 3% by weight.

27. The thermoplastic composition of claim 16 wherein the block copolymer is selected from the group consisting of styrene-ethylene/butylene-styrene block copolymers, styrene-ethylene/propylene-styrene block copolymers, and mixtures thereof.

28. A thermoplastic pellet:
   I. a thermoplastic composition comprising:
      a) from about 2% by weight to about 20% by weight of at least one high molecular weight block copolymer having a weight average molecular weight greater than about 200,000; and
      b) from about 20% by weight to about 98% by weight of plasticizer;
   II. from about 0.1% by weight to about 3% by weight of a pelletizing aid substantially surrounding said thermoplastic composition;

wherein said composition has a storage modulus ranging from about $1\times10^4$ dynes/cm$^2$ to about $5\times10^6$ dynes/cm$^2$ and a tack-free surface both prior to melting the pellets and after melting and resolidification.

* * * * *